(No Model.)

A. BUTZER.
POCKET GOPHER TRAP.

No. 543,206. Patented July 23, 1895.

Witnesses.
Wallace L. Newell
C. E. Griffith.

Inventor.
Albert Butzer.

UNITED STATES PATENT OFFICE.

ALBERT BUTZER, OF DEER PARK, WASHINGTON.

POCKET-GOPHER TRAP.

SPECIFICATION forming part of Letters Patent No. 543,206, dated July 23, 1895.

Application filed November 6, 1894. Serial No. 528,057. (No model.)

*To all whom it may concern:*

Be it known that I, ALBERT BUTZER, a citizen of the United States, residing at Deer Park, in the county of Spokane and State of Washington, have invented certain new and useful Improvements in Pocket-Gopher Traps of which the following is a specification.

The object of my invention is to provide a simple, economical, and efficient pocket-gopher trap; and the invention consists in the features and combinations hereinafter described and claimed.

Figure 1:
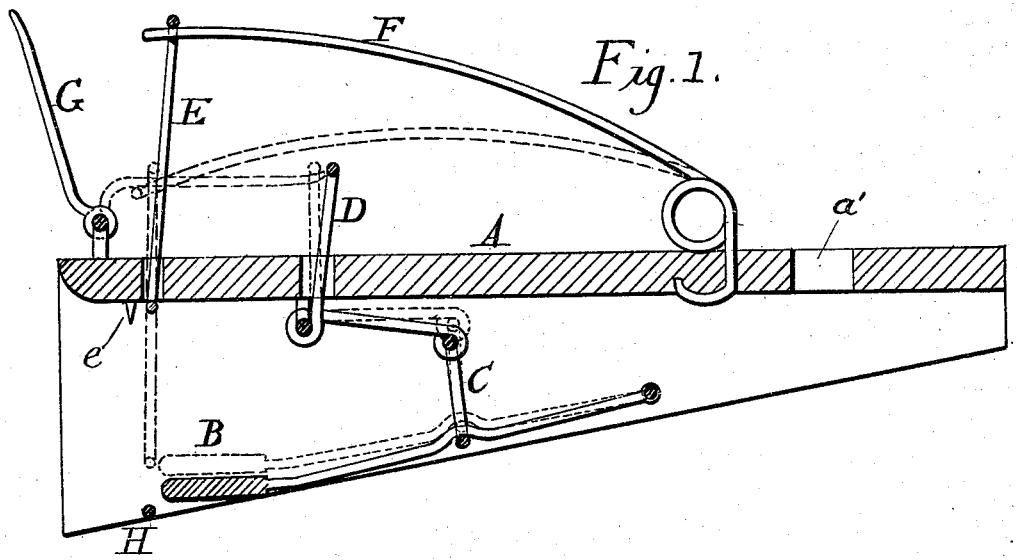
Figure 2:
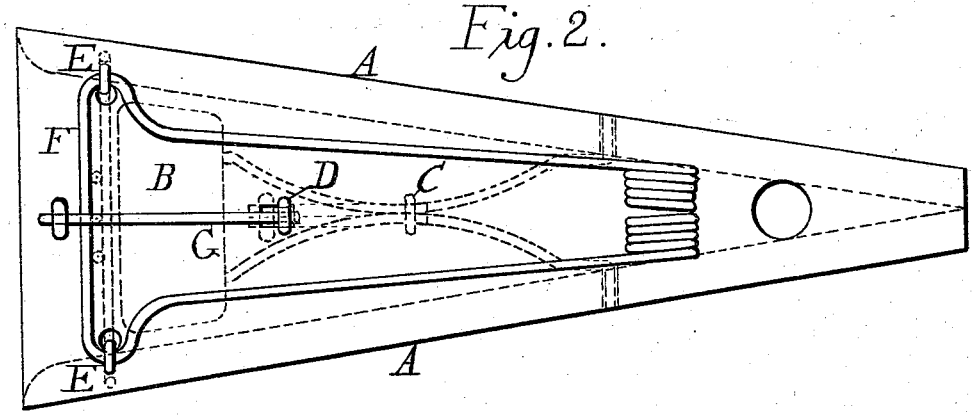

In the accompanying drawings, Figure 1 is a vertical sectional elevation of my improved trap taken on a longitudinal central line, and Fig. 2, a plan view of the trap looking at it from the top.

My invention relates especially to traps for capturing and destroying small animals, particularly the animal known as the "pocket-gopher," which is noted for its destructiveness to field plants and orchards. Its characteristics are well known, among them being the fact that it burrows in the ground and throws up small "gopher-hills," the center of which is provided with a small hole. It does not allow this hole under any circumstances to remain open but a short period of time.

The principal object of my invention, therefore, is to provide an animal-trap especially adapted to the capture and destruction of pocket-gophers by combining in an organized artificial structure certain mechanical elements and features which resemble very closely the habitation of such animal.

In constructing my improvement I provide a box or frame portion $a$, of the desired form and size, but which I make to preferably provide a substantial pyramid-shaped chamber, so as to concentrate the light which enters through an aperture $a'$ at the apex or narrowest point. This structure in a measure resembles the ground hole of the gopher. The frame portion is preferably made open at the bottom and what might be termed the "pyramid-base," and is held together by means of a clamping rod or wire H.

To capture and destroy an animal entering what I term the "base-opening of the chamber," I provide a treadle B, which is pivoted to the side of the frame at $b$, so as to form a releasing mechanism for the strangling-loop, but which for simplicity I will term the "engaging-loop" E. The engaging-loop, which is placed near the entrance to the chamber, is made nearly the width of the chamber and is passed through suitable openings in the upper portion of the frame, to be engaged by the actuating mechanism. Secured to the under surface of the frame-top, and preferably adjacent to the engaging-loop, are spikes or sharp projections $e$, so arranged that as the loop is brought quickly upward the animal is impaled on these projections and instantly killed.

In order to actuate the loop at the proper time an actuating-spring F is provided, and which is secured in any convenient manner to the upper portion of the frame. I prefer to make this spring double and of round wire, as shown in Fig. 2, with its forward or free end engaging suitable eyes in the engaging-loop. The loop and its actuating-spring are held down by means, as shown in dotted lines of Fig. 1, of trigger G, which is adapted to pass over the free end of the actuating-spring and be engaged by a right-angular latch D, which is preferably pivoted to the inner side of the top portion of the trap. This latch has its opposite free end provided with a downwardly-extending rod C, which normally holds the treadle-lever in its up position, as shown in the dotted outline of Fig. 1.

Describing the operation of my improvement, it is well known that the pocket-gopher is an animal that has been provided by nature with a very sensitive head and nose, so that if it strikes anything with its head or nose before it is caught it would withdraw itself with lightning-like rapidity. In the use of my improvement, however, the animal enters the wider opening of the frame, being attracted thereto by the light that enters through the aperture $a'$, and being in a hurry to close up its hole it passes through the engaging-loop, bringing the weight of its feet and forward portion of the body upon the treadle. This action depresses the treadle into the position shown in the solid lines of Fig. 1 and vibrates the latch D away from the trigger, so that the tension of the actuating-spring draws up the engaging-loop, forcing the head and body of the gopher against the projections and instantly killing the animal.

While I have described my invention with more or less minuteness as regards details and as being embodied in precise forms, I do not desire to be limited thereto unduly, no more than is pointed out in the claims. On the contrary, I contemplate all proper changes in form, construction, and arrangement, the omission of parts, and the use of equivalents, as circumstances may suggest or necessity render expedient.

I claim—

1. A pocket gopher trap, in which there is combined a tapered frame portion provided with a substantially tapered receiving chamber and having an opening near its narrow portion, an engaging loop near its large entrance or opening, an actuating spring for operating such loop, latch mechanism to hold such spring under tension and the loop in its depressed set position, a pivoted treadle adjacent to such loop and arranged to release the latch mechanism as it is depressed to spring the trap, substantially as described.

2. A pocket gopher trap in which there is combined, a substantially pyramid-shaped frame open on one end and its "base" and provided with an aperture at $a'$, to concentrate light at the narrowest end of its tapered chamber, an engaging loop near its open end, an actuating wire spring connected with the engaging loop to operate the same, a trigger to hold the engaging spring under tension and the loop in its depressed set position, a pivoted latch to hold the trigger and other parts in their set position, and a pivoted treadle connected with the pivoted latch with its free end arranged adjacent to the engaging loop so that its depression will release the latch and spring the trap, substantially as described.

3. A pocket gopher trap, in which there is combined, a substantially tapered frame portion having a corresponding shaped chamber and provided with an aperature near its narrow end, an engaging loop near the entrance, impaling projections on the under side of the frame adjacent to the loop, an actuating spring for operating such loop, latch mechanism for holding the spring under tension and the loop in its set position, a treadle portion adjacent to such loop and arranged to release the latch mechanism as it is depressed to spring the trap, substantially as described.

ALBERT BUTZER.

Witnesses:
WALLACE L. NEWELL,
C. E. GRIFFITH.